(12) United States Patent
Bloome et al.

(10) Patent No.: US 8,336,186 B2
(45) Date of Patent: Dec. 25, 2012

(54) APPARATUS FOR PLACING AND ATTACHING FORMED FILTERS INTO BREWING CUPS

(75) Inventors: James A. Bloome, Port Byron, IL (US); Kelly D. Eastman, Walcott, IA (US); Rick A. Meeker, Davenport, IA (US); Rodney P. Smith, Moline, IL (US)

(73) Assignee: Packaging Technologies, Inc., Davenport, IA (US)

( * ) Notice: Subject to any disclaimer, the term of this patent is extended or adjusted under 35 U.S.C. 154(b) by 1178 days.

(21) Appl. No.: 11/970,996

(22) Filed: Jan. 8, 2008

(65) Prior Publication Data

US 2009/0173043 A1 Jul. 9, 2009

(51) Int. Cl.
*B21D 39/00* (2006.01)

(52) U.S. Cl. ............... 29/509; 29/428; 29/434; 29/469; 99/295; 99/297; 99/298

(58) Field of Classification Search ............... 29/428, 29/434, 469, 509; 99/295, 297, 298, 317
See application file for complete search history.

(56) References Cited

U.S. PATENT DOCUMENTS

| 3,657,993 | A | * | 4/1972 | Close ............................ 99/297 |
| 5,035,106 | A | | 7/1991 | Haase |
| 5,913,798 | A | | 6/1999 | Grabher |
| 6,558,305 | B1 | | 5/2003 | Haggman |

FOREIGN PATENT DOCUMENTS

FR 2261868 9/1975

OTHER PUBLICATIONS

International Search Report and Written Opinion of the Internatl Searching Authority from PCT/US2009/030301, mailing date Jun. 12, 2009 (17 pages).

* cited by examiner

*Primary Examiner* — Richard Chang
(74) *Attorney, Agent, or Firm* — Wood, Herron & Evans, LLP

(57) ABSTRACT

A filter setting and sealing apparatus includes a wobble plate mounted to press a filter edge into a plane defined by the top rim of a brew cup. A sealer defined by expandable sealer jaws is moveable into the filter. The jaws are actuated for radial outward expansion to seal the filter to the cup proximate the filter rim and cup edge. A second sealer is used to seal any gaps remaining in the seal after initial sealing.

9 Claims, 5 Drawing Sheets

APPARATUS FOR PLACING AND ATTACHING FORMED FILTERS INTO BREWING CUPS

FIELD OF THE INVENTION

This invention relates to the beverage industry and more particularly to the introduction and sealing of a filter into a brew cup, known in the industry as a "K-cup".

BACKGROUND OF THE INVENTION

More particularly, liquid coffee is dispensed from coffee makers or vending devices by the preparatory use of coffee grounds or media containing brew cups having a filter therein.

In the past, cup-shaped fluted surface filters are placed into a brew cup, dividing the cup into two chambers, one holding the media for preparing the beverage and one receiving the liquid beverage resulting from passage of a liquid through the media and the filter. In one instance, for example, the media is coffee (typically in powdered or ground form) and the beverage produced is liquid coffee. A pierceable top is sealed over the filter and media. Hot water is injected through the pierced top, into the media. Liquid passing through the media flows through the filter and into the lower chamber, producing a beverage which, in the coffee vending or making application, is transferred to an appropriate container for consumption.

Consistent manufacture and assembly of the filters, tops and media in the brew cups is desired, with numerous prior devices having been created to accomplish this task.

Related application, U.S. patent application Ser. No. 11/766,369, filed Jun. 21, 2007, which is incorporated herein by reference, describes improved methods and apparatus related to the transfer of filters to and into brew cups. That application is expressly incorporated herein in its entirety as if fully set forth herein.

This current application is directed to accurate placement of cup-shaped filters into respective brew cups and to the further securement or sealing of the filters to the respective brew cups.

In this regard, the assembly of the filter to the cup should be consistently accomplished over many cycles so that the combination of each brew cup, filter and media in each unit is without aberration or deviation and can be effectively used in brewing, dispensing and beverage handling systems.

Currently, it is known that filters are positioned and welded to the cups in a single "push-down" motion. Filters must be placed with the top of the filter set accurately to a specified dimension above the top of the cup. Any variation in location of the filter above the cup prior to welding can result in a failed weld. The prior welding head, including a plastic sealing cone, is used to push the filter to a hopefully proper level in the cup by means of the heated sealing cone. The heated sealing cone both positions and welds the filter by pressing down toward the cup as it seats or places the filter therein. Any misalignment between the welding head and filter causes one side of the filter to be pushed lower than the rest. If one side of the filter is pushed lower than the rest of the filter, a failed seal may result. Thus, the welding head must be precisely located by using a system of linear rails, allowing the head to float. Pins attached to the head center the head by locating the head carrier plate as the head is lowered.

Accordingly, such prior systems require equipment providing significant precision alignment and guide apparatus. Given the relative flimsy nature of the filter material, consistent control over and placement of the filter during final placement and welding is difficult with these prior systems and material factors. Aberrations such as failed or incomplete seals allow media spills and inconsistent handling at the beverage making or dispensing machine. Liquid spills, inaccurate flow of liquids through inconsistent media volumes, and brew cup jams or other malfunctions can occur.

It has thus been one objective of the invention to provide improved apparatus and methods for accurately placing filters into brew cups and for sealing the filters to those cups.

Another objective of the invention has been to provide improved filter to cup sealing apparatus and methods.

Another objective of the invention has been to provide apparatus and methods for sealing filters to brew cups, yet without the vagaries of, or aberrations in, seal creation produced by prior systems such as prior welding heads, sealing and pusher cones and the like.

SUMMARY OF THE INVENTION

To these ends, the invention in one embodiment contemplates positively locating the filter with respect to the top of the cup prior to welding and thus eliminates the variability in filter location. An expanding weld collet is inserted into the filter and prevents failures caused by the prior combined push-down and welding action. The expanding collet allows for reasonable variation in location while still providing an acceptable filter-to-cup weld, eliminating the need for the prior locating devices. A second expanding collet is then inserted to seal any gaps, that is to complete the seal around the filter to the cup. Each expanding collet provides about seventy-five percent coverage of the total weld, providing redundancy in any overlap that will improve the final quality. Furthermore, the greater width of the sealing area of the collets results in a final weld area in the approximate range of four times greater than by the current or prior weld system designs.

The invention also contemplates the possibility that full seals can be provided by application of a single collet, the seals propagating to produce a consistent seal throughout the filter/cup interface.

With more particularity, the invention in one embodiment contemplates setting delivered filters into a specific height above the top of respective brew cups, with the filters being previously positioned over or within the cup, by a transfer apparatus, such as shown, for example, in applicant's related application Ser. No. 11/766,369, filed Jun. 21, 2007, incorporated herein by reference. Thereafter, the cups are conveyed beneath a tamp head according to the invention to precisely position the upper edge of the filter with respect to the upper rim or edge of a brew cup. Preferably, the two respective upper edges will lie then in approximately the same horizontal plane. In other words, the top edge of the filter will preferably be placed level with the top flange or rim of the cup. The formed filters are thus set to a predetermined level respecting the top of the brewing cup and are thereafter welded thereto as will be described It will be appreciated that the filters are first delivered to a partially set position within the cups by apparatus and processes such as that in the aforesaid application. The filter/cup units with the partially set filters are then transferred to the tamp head for final accurate placement.

This invention thus contemplates a method of and apparatus for accurately controlling the placement of the formed filter by using a tamp head as a tamper to push the formed filter into position, and the later welding of the filter in a separate step by using an expanding sealing collet preferably in a two stage sealing process to weld the filters to the cups by conduction transfer of heat.

A tamper and two expanding collets for successive operation as a single filter or cup unit are attached to a single fixture plate which is lowered into position during each cycle and raised after the work is completed. For each such cycle, one filter is positioned in a cup, another filter is initially sealed to its cup and yet another filter is finally sealed to its cup. The brewing cups and filters are thus transferred, sequentially, through tamping, sealing and final sealing stations. A cup transfer plate for shifting or moving the cups and their filters moves on guide rails, powered by a pair of air cylinders.

Brewing cups with partially inserted formed filters are transferred by the carrier or transfer plate to the tamper apparatus. The tamper apparatus pushes on the top edge of the filter using a weighted, floating disk until the disk rests on top of the brewing cup, leaving the formed filter edge preferably flush with the top rim of the cup. Alternately, the apparatus is adjusted so the upper edge of the filter extends slightly above the edge of the cup.

The carrier plate than transfers the cup and filter to a position beneath the first expanding collet. The collet defines a segmented sealing cylinder with an inward taper on the internal diameter. An internal plunger with a matching taper and containing a heat source is reciprocated within the collet by an air cylinder, causing the collet to expand for sealing and then contract. The expanded collet terminates in heated sealing jaws which press the formed filter against the brewing cup, heat welding the filter to the cup in the areas of contact by heat transfer. The carrier plate then transfers the partially welded cup and filter to a position beneath the second expanding collet and then the process is repeated. The second collet is positioned or angularly oriented so that the contact points cover or traverse any seal gaps left after sealing by the first collet.

By positively locating the filter with respect to the top of the cup prior to welding, the variability of or aberrations in filter location is eliminated and the placement operation is separated from the sealing operation. The expanding motion of the collet prevents the failures caused by a prior combined push-down welding action. The expanding collet allows for reasonable variation in location while still providing an acceptable weld, eliminating the need for the locating devices. Each expanding collet provides about seventy-five percent coverage of the total circumferential weld, providing redundancy that will improve the final weld quality. Furthermore, the greater width of the sealing area of the collet results in a final weld area four times or more greater than the current devices where a "push-down" welding operation is used.

These and other objectives, alternatives and advantages will become readily apparent from the following written description of a preferred embodiment and certain alternative embodiments of the invention and from the drawings in which:

DETAILED DESCRIPTION OF THE DRAWINGS

Figures 6, 7:
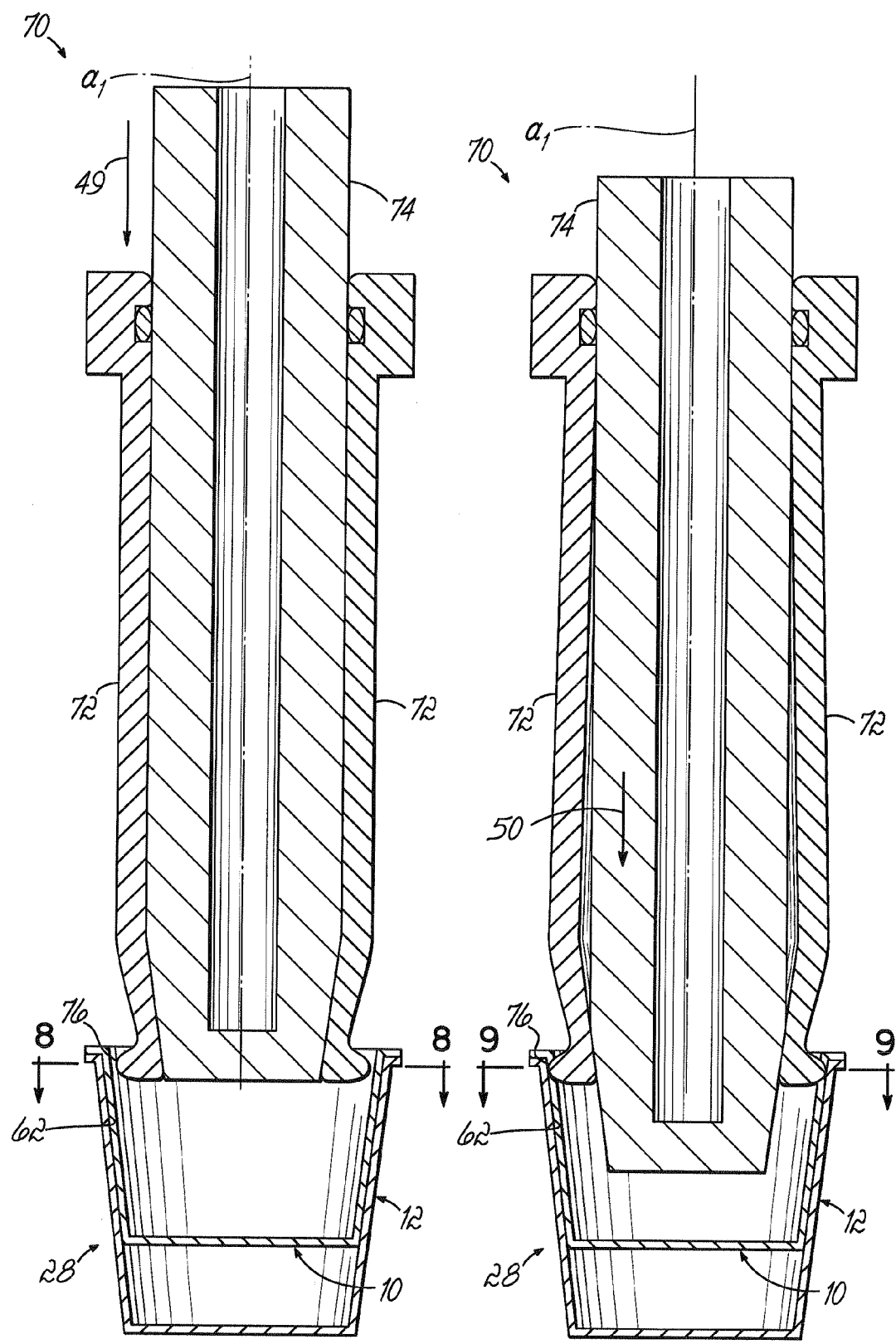
FIG. 6 is a cross-sectional view similar to FIG. 4 but of a second sealer inserted into the filter/cup unit received from the first sealer of FIG. 4.
FIG. 7 is a cross-sectional view of the second sealer of FIG. 6 but showing the second sealer expanded for sealing.
Figure 8:
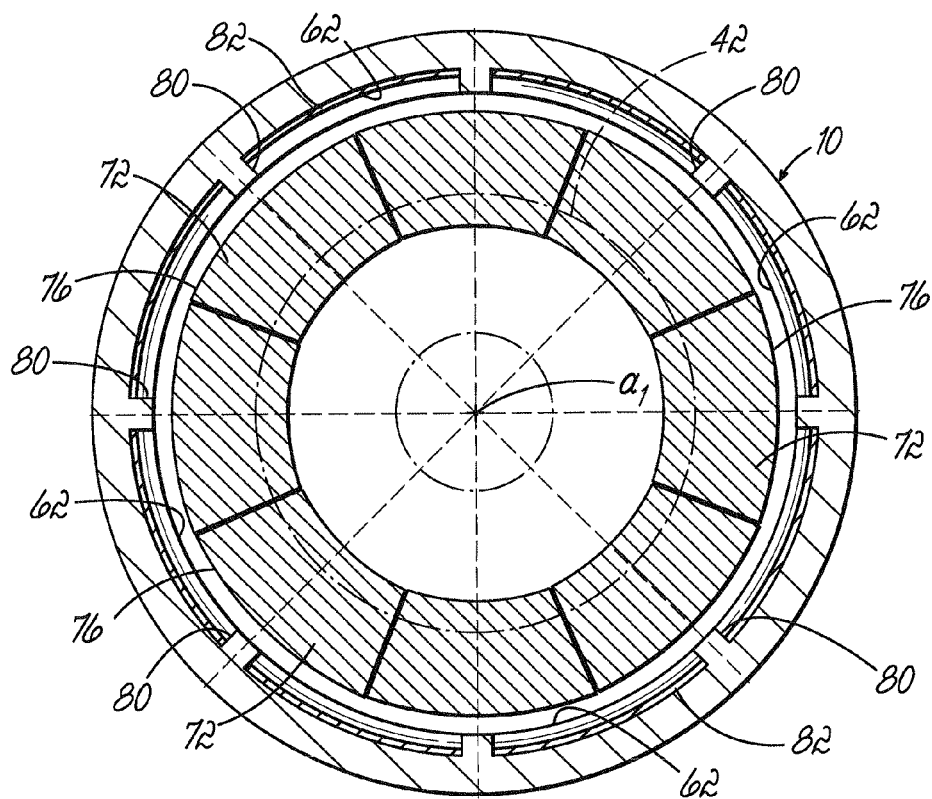
Figure 9:
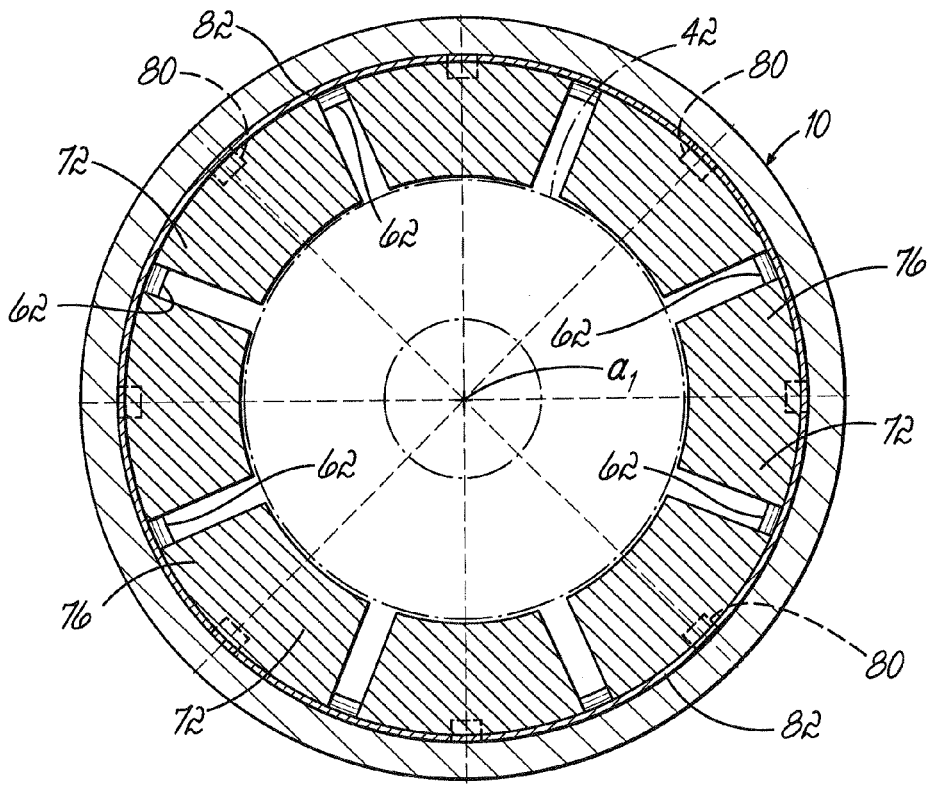

FIG. 8 is a cross-sectional view taken along lines 8-8 of FIG. 6 and illustrates the angular orientation of the second sealer of FIG. 6; and FIG. 9 is a cross-sectional view taken along lines 9-9 of FIG. 7 and showing the angular orientation of sealer 70 about its axis as it is operated to seal filter to cup according to the invention.

DETAILED DESCRIPTION OF THE INVENTION

Figure 1:
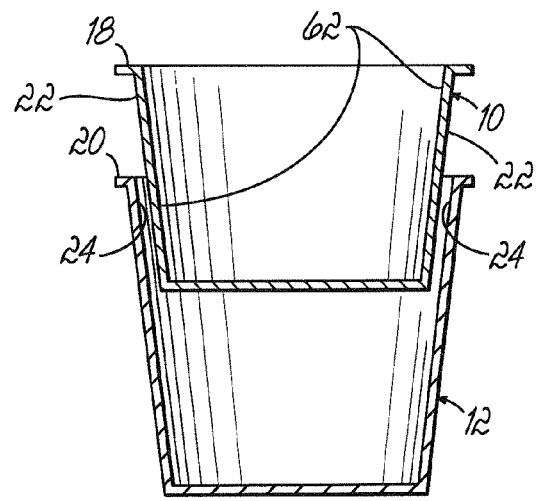
FIG. 1 is an illustrative exploded cross-section of a filter and a brew cup.
Figure 1A:
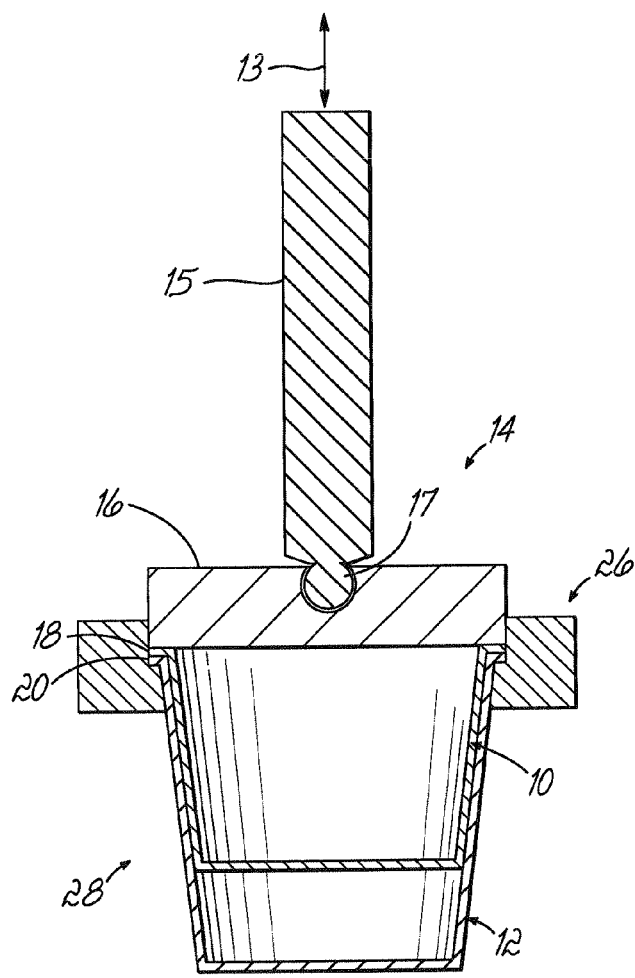
FIG. 1A is a cross-sectional elevational view illustrating placement of a filter within a brew cup according to the invention.

Turning now to the drawings, there is shown in FIG. 1 a filter 10 and a brew cup 12 with filter 10 shown partially set in cup 12. In FIG. 1A, the filter 10 has been placed in a brew cup 12 by a reciprocal tamper 14. Tamper 14 is comprised of a rod 15 reciprocable in the direction of arrow 13 and a floating tamp plate or head 16 mounted on rod 15 so as to be reciprocal therewith, but capable of axial "wobble" about pivot 17 as rod 15 reciprocates and as plate 16 engages upper edge 18 of filter 10 and/or upper rim 20 of brew cup 12 (Rim 20 is preferably a flange as shown, provided to present a sealing surface for eventually sealing a brew cup top thereover in a known manner).

In this regard, as plate 16 engages the upper edge 18 of filter 10, it pushes the filter down into the cup 12 with the filter "finding" or setting into a natural precise position in the cup.

In this regard, the downward motion of rod 15 stops when tamper plate 16 engages the cup rim 20, thus insuring edge 18 and rim 20 are essentially co-located in the same plane. An alternative feature tamp head 16 may be used, if desired, to set filter edge 18 slightly below cup rim 20.

For descriptive purposes, filter 10 has an outside annular or circumferential surface portion 22 thereabout just below edge 18 and cup 12 has a complementary inside annular surface portion 24 therein just below cup rim 20.

As will be described, outer portion 22 of filter 10 will be adjacent to or abutting complementary inner portion 24 of cup 12. These portions will be sealed together as by heat conduction welding as will be described.

As shown in FIG. 1A, cup 12 is carried by a suitable cup conveyor or transfer 26 including a carrier plate or other cup holding structure (not shown in the other FIGS. for clarity). It will be appreciated that conveyor 26 can be of any suitable configuration or structure capable of receiving and transferring cups 12 and filters 10 through the stations depicted in the following Figures.

It will be appreciated that FIGS. 1A-7 illustrate serial operations carried out by the invention on a single filter and cup unit 28 as shown. In use, multiple numbers of combined filter and cup units 28, respectively, can be transported through the system illustrated by the FIGS. 1A-7, such that the operations depicted by the Figures are carried out simultaneously on successively conveyed and respective cup and filter units 28.

Figure 2:
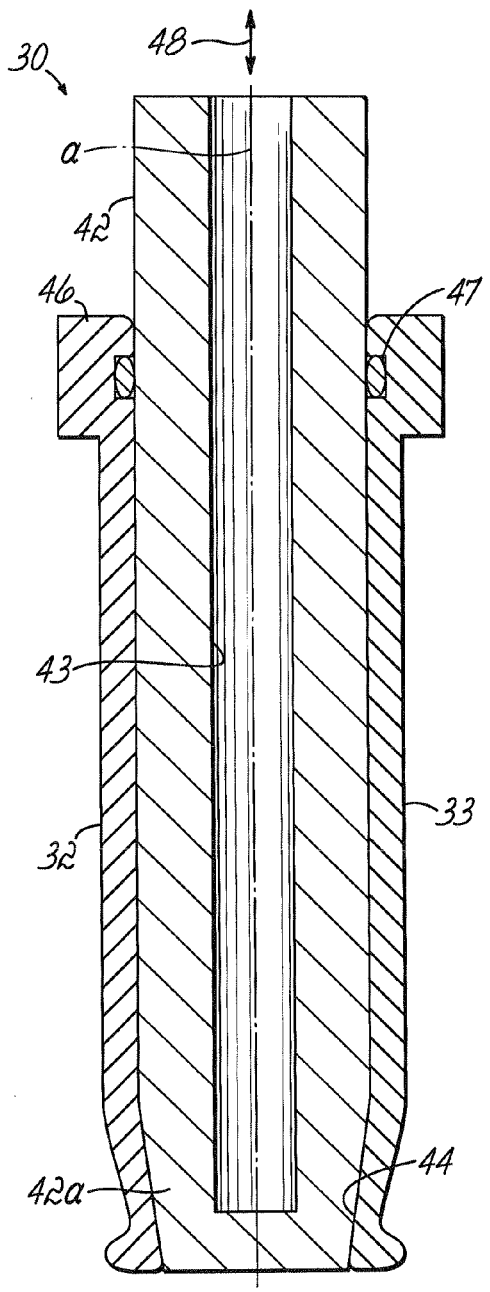
FIG. 2 is a cross-sectional elevational view of a brew cup with filter placed therein and oriented beneath a first reciprocal and expandable sealer, with the cup conveyor or transfer not shown for clarity.
Figure 3:
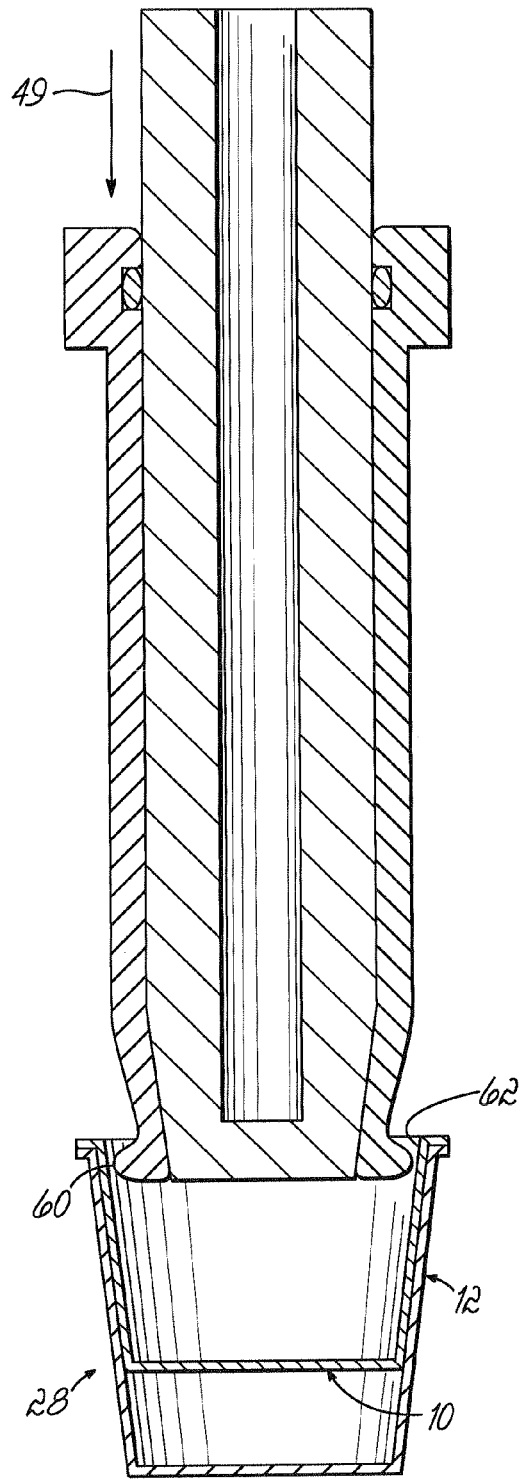
FIG. 3 is a cross-sectional elevational view similar to FIG. 2 but showing the first sealer in a lower position within the filter and cup combination.
Figure 4:
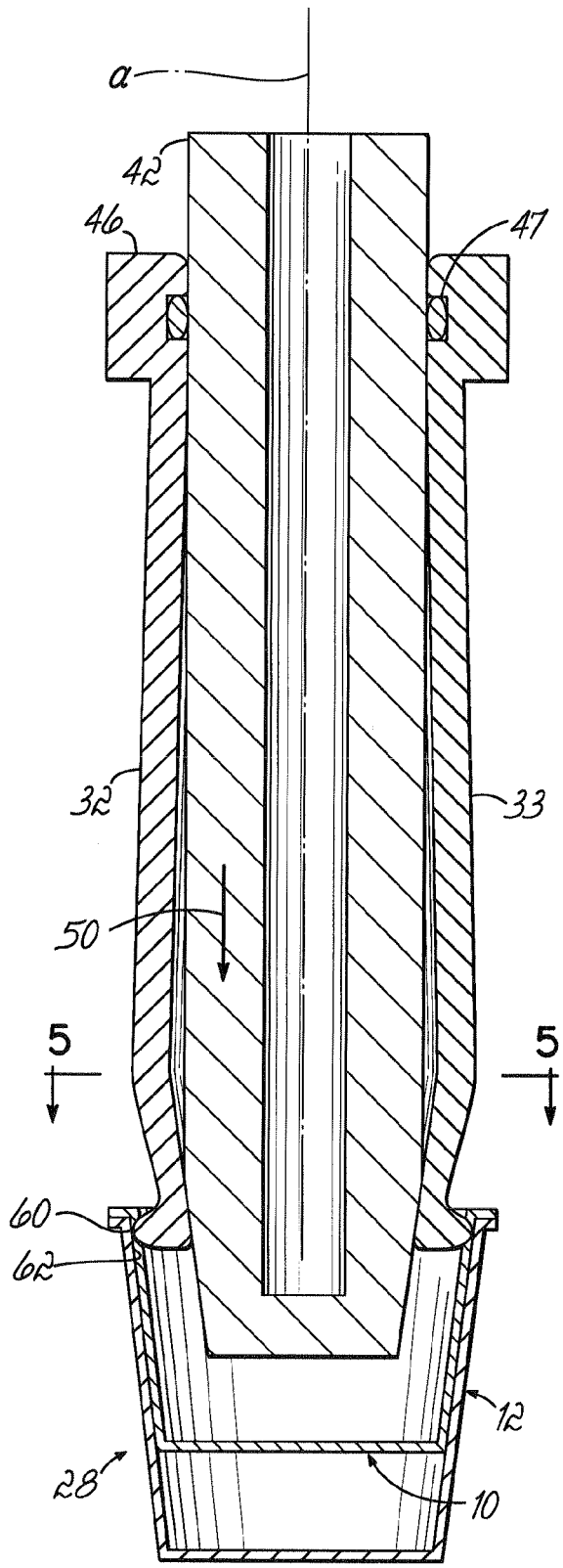
FIG. 4 is a cross-sectional elevational view similar to FIG. 3 but showing the sealer collet expanded for sealing the upper outer surface portion of the filter to the upper inner surface portion of the cup.
Figure 5:
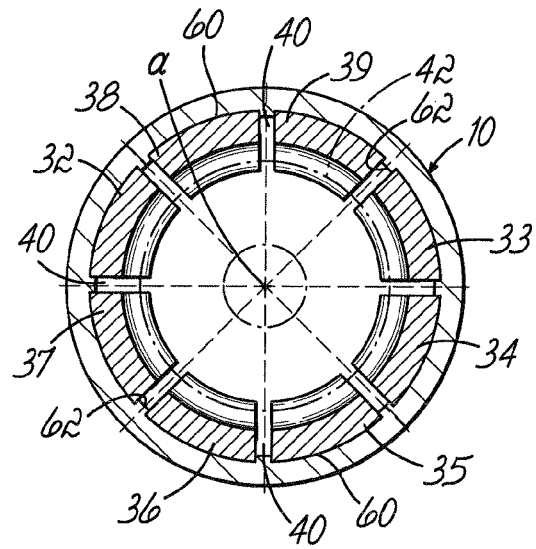
FIG. 5 is a cross-sectional view of the first expandable sealing collet and activating mandrel of FIGS. 2-4 taken along lines 5-5 of FIG. 4.

FIG. 2 illustrates a combined filter and cup unit 28 moved under a first sealer 30. Sealer 30 includes a collet defined by a plurality of expandable sealer jaws (such as at 32 and 33), only two of which are illustrated in FIGS. 2, 3 and 4. Other jaws 34-39 of this plurality are illustrated in FIG. 5. It will be appreciated that the jaws are separated one from the other by gaps 40 at their lower ends, at least when expanded to seal as in FIGS. 4 and 5, if not when at rest. Thus, when sealing, there is a gap between each respective jaw 32-39.

Returning to FIG. 2, the first sealer 30 further includes a reciprocal mandrel 42 having a bore 43 for receiving a heater such as any appropriate cartridge heater (not shown). Any appropriate heater can be used. Mandrel 42 has a lower inwardly tapered end 42a with the major diameter of the mandrel being greater than its diameter at lower end 43. Sealer jaws 32-39 also have inwardly tapering surfaces such as at 44.

The upper end of jaws 32-39 terminate in a boss 46 provided with an inner seal 47 surrounding an upper portion of mandrel 42. Mandrel 42 and jaws 32-39 are moveable together in reciprocal directions indicated by arrow 48. Mandrel 42 is also moveable relative to jaws 32-39 as will be described.

In particular, mandrel 42 and jaws 32-39 are moveable downwardly into cup and filter unit 28 in the direction of arrow 49 (FIG. 3).

Thereafter, the mandrel 42 is moved further downwardly in the direction of arrow 50 (FIG. 4). When this relative movement occurs, tapered end 42a of mandrel 42 engages tapered surface 44 of respective jaws 32-39, displacing them radially outwardly as illustrated in FIG. 4 so that outwardly facing sealing surfaces 60 of jaws 32-39 move outwardly, engaging an inner surface 62 of filter (10) 10 and sealing its outer portion 22 (FIG. 1) to inner portion 24 of cup 12 by heat conduction. Preferably this welds filter (10) 10 to cup 12 at respective annular portions 22, 24, respectively.

It will be appreciated that the annular or circumferential seal between filter 10 and cup 12 is generally segmented, following generally the circumferential extension of sealing surfaces 60 of the jaws, and extending into adjacent areas where the seal propagates by heat.

In one embodiment, the seal propagation is insufficient to extend over the gaps between the respective, expanded seal jaws. Thus, there may remain unsealed areas or gaps between filter portion 22 and cup portion 24, corresponding to gaps 40. It is nevertheless desirable to fully seal the filter 10 to cup 12 about the entire periphery comprising outer portion 22 of filter 10 and inner portion 24 of cup 12.

To these ends, the invention contemplates a second sealer 70 (FIGS. 6-9) having a plurality of respective jaws 72 and a mandrel 74, each of which correspond in structure to jaws 32-39 and mandrel 42 of first sealer 30, respectively. A heater (not shown) such as a cartridge heater is oriented in mandrel 74 as is the heater in mandrel 42. The difference between second sealer 70 of FIGS. 6-9 and first sealer 30 of FIGS. 2-5 is that the jaws 72 of second sealer 70 are oriented at a different angle about mandrel 74 and the longitudinal axis a-1 of sealer 70 (as illustrated in FIG. 7) than are jaws 32-39 with respect to mandrel 42 and the longitudinal axis a of sealer 30. Thus, jaws 72 with their respective sealing surfaces 76 are positioned to seal together previously unsealed areas of portions 22, 24 caused by gaps 40 between jaws 32-39.

Accordingly, after initial sealing by jaws 32-39 of first sealer 30, the combined filter/cup unit 28 is transferred under second sealer 70 for final sealing.

It will be appreciated that the features and functions of sealer 30 and sealer 70, respectively, are otherwise identical except for the angular offset of the jaws as noted. Accordingly, a full and complete annular seal is formed between filter 10 and cup 12 in respective portions 22, 24.

This operation is illustrated in FIGS. 8 and 9 wherein jaws 72 of sealer 70 are oriented about axis a-1 at different angles than jaws 32-39 and axis a of sealer 30.

FIGS. 8 and 9 also illustrate the second sealer 70 with jaws 72 "bridging" gaps 80 in previous segment seal 82.

It will also be appreciated that the circumferential extent of sealing surfaces 60 and 76 are each preferably about 75 percent of the entire circumferential seal desired. Thus, the seal applied by second sealer 70 overlaps portions of the seal applied by sealer 30, as well as overlaps unsealed areas at portions 22, 24 corresponding to gaps 40 between jaws 32-39 of sealer 30. Of course, it will be appreciated that the seals formed are a function of a variety of parameters including material composition of filter and cup, thickness of those components, extent and temperature of jaws 32-39 and 70 and dwell time of the respective jaws against or near filter 10.

Variations can be applied for different sealing operations. Optionally, the jaws 32-39 and surfaces 60 of sealer 30, together with sealing parameters of the system including those noted above, could be selected so that full annular seals might be obtained by heat propagation of seals applied solely by the first sealer 30. Also, the circumferential extent of jaws 32-39 and/or jaws 72 could be modified for desired sealing effect. Less overlap of the second sealer 70 could also be used.

In any event, materials, heat and dwell time are selected in the foregoing embodiment described above so that the full seal is created with the redundant seal overlap as described.

Moreover, it will be appreciated that the width of the seal provided is relatively wide, as compared to that of prior devices. In particular, the vertical width of the seal (as viewed in the Figures) corresponds to that of the faces 60, 76 of the jaws, together with any propagation.

The substantial seal width is advantageous to sealing integrity, particularly as compared to prior seals provided by prior sealing cones and which tended to be relatively narrow, or even produced by line contact of a sealing cone as compared to the wider surfaces 60, 76.

Moreover, it will be appreciated that in use, a filter 10 is introduced to a cup 12 as by any suitable feed or transfer, such as that shown in applicant's co-pending application Ser. No. 11/766,369. Tamper 14 engages the top edge 18 of filter 10 and pushes it uniformly downward into cup 12 until edge 18 and rim 20 are preferably co-located in the same horizontal plane. Thereafter, the combined filter and cup unit (28) is transferred under sealer 30 (FIG. 2) which is lowered into the unit 28 (FIG. 3) and the sealer 30 expanded by continued downward movement of mandrel 42 (FIG. 4) to force jaws 32-39 radially outward to engage the upper portion of filter 10 and create an annular or segmented circumferential seal portions 82 between portion 22 of filter 10 and portion 24 of cup 12. Where the seal is incomplete, the partially sealed filter/cup unit 28 is transferred under a second sealer 70 which is lowered therein (FIG. 6) like the first sealer 30 to seal previously unsealed areas between filter 10 and cup 12 and to enhance the first seal segments 82.

Separation of the filter setting operation (FIG. 1A) from the subsequent sealing apparatus described, enhances and facilitates the accurate placement of the filter in the cup. That placement is then consistent from cup-to-cup and aberration of the filter placement and subsequent seal failures are diminished or eliminated. Subsequent sealing operations as described accurately provide full and consistent seals.

It will be appreciated that a variety of filter configurations can be processed as described, including both smooth wall and fluted filters, composite filters and the like.

It will also be appreciated that any suitable mechanical, electrical, hydraulic or other motion expedients can be adopted to operate, heat and move the components of the invention as will be recognized by those of skill in this field.

Moreover, any suitable sealing expedient or apparatus can be used within the scope of the invention, including but not limited to induction, radiation or other forms of sealing than sealing by head conduction welding as described.

Also, it will be appreciated that the final sealing of any gaps left in the initial sealing operation could also be sealed by angularly rotating the filter/cup unit 28 or the sealer 30 with respect to each other so that the sealing surfaces 60 bridge any prior unsealed gaps, thus eliminating the need for a second sealer 70.

Thus, the apparatus and methods described herein provide enhanced and improved accurate filter placement and sealing into and to brew cups, eliminating aberrations produced by known prior devices.

This invention further contemplates a variety of alternatives from the embodiments described above.

In one variation, alternate expedients may be used to expand the sealing jaws radially and in conjunction with, or in place of, the mandrels as shown. Alternatives may include such expedients as bearings, pins or other apparatus.

Horizontally articulating plates may be used in place of the segmented radially expanding jaws.

The expanding collets may be driven mechanically from the cup filling machine, independently powered by pneumatics, hydraulics or electronic drives such as servos.

The heat source may be located in the mandrel or in the expanding jaw collet or heat may be applied to the collet or its jaws by radiant energy or by radio frequency energy or induction.

The transport plate or conveyor for the units 28 may be mechanically driven directly from the cup filling machine, independently driven by pneumatics, mechanics or hydraulics or by electronic devices such as servos.

Finally, it will be appreciated that the fixture or transport plate for supporting and moving the units 28 can be multiplied and used with several rows of tamp heads and welding collets for higher production rates of sealed units 28.

These and other alternatives, modifications and advantages will become readily apparent to those of ordinary skill in the field to which this invention pertains and applicant intends to be bound only by the claims appended hereto.

What is claimed is:

1. An apparatus for sealing a filter in a brewing cup, the apparatus comprising:
    a first expanding collet sealer for insertion into said filter, said collet sealer having a plurality of sealing jaws for sealing a first portion of an outside surface of the filter to an inside surface of a brewing cup; and
    a second expanding collet sealer for insertion into said filter and cup, having a plurality of sealing members for sealing a second portion of said outside surface of the filter to another inside surface of the brewing cup such that an unbroken annular seal is formed between the said outside surface of said filter below the top edge of the filter and the surrounding inside surface of the cup.

2. The apparatus as in claim 1 further including a tamp head for inserting said filter in said cup, said tamp head comprising a wobble plate for engaging a top edge of said filter and for pushing said edge and filter respectively toward and into said cup.

3. The apparatus as in claim 2 wherein said wobble plate has a range of motion to push said edge into a plane defined by an upper rim of said cup.

4. The apparatus as in claim 1 wherein said first collet sealer comprises a plurality of expandable jaws, said jaws defining sealing surfaces and further wherein said sealing surfaces are separated, one from the other, when said jaws are expanded.

5. The apparatus as in claim 4 wherein said second expanding collet sealer is comprised of a plurality of sealer jaws oriented about said sealer to bridge the gaps between the sealing surfaces of the jaws of the first sealer.

6. An apparatus for sealing a filter into a brewing cup and including:
    an expandable sealer defined by a plurality of sealing jaws oriented radially about a longitudinal axis of said sealer;
    said jaws having outwardly facing sealing surfaces thereon;
    a reciprocal mandrel oriented on said axis;
    said mandrel and said jaws having respective cooperating surfaces thereon;
    said jaws being expandable in a radially outward direction when said mandrel is extended relative to said jaws so that said sealing surfaces engage, press and seal said filter to said cup.

7. An apparatus for setting a filter having a top edge into a cup having a top rim with said top edge residing in the same plane as the top rim of the cup, said apparatus comprising:
    a wobble plate having a lower surface and being mounted for reciprocal movement toward and away from said top edge;
    said wobble plate movable to engage said top edge and to push said top edge and filter respectively toward and into said cup; and
    wherein said wobble plate has a range of motion sufficient to push said top edge into a plane defined by the top rim of said cup, said plate engaging both said top edge and said rim.

8. Apparatus as in claim 7 wherein said wobble plate has a range of motion sufficient to push said top edge into a plane defined by the top rim of said cup.

9. An apparatus as in claim 7 wherein said filter is a coffee filter and said cup is a brew cup.

* * * * *